Figure 1:
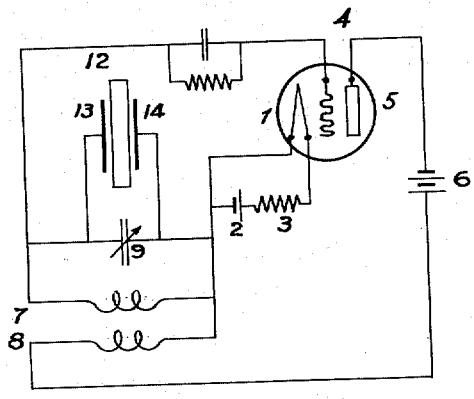

March 26, 1929. W. G. CADY Re. 17,247

METHOD OF MAINTAINING ELECTRIC CURRENTS OF CONSTANT FREQUENCY

Original Filed May 28, 1921

INVENTOR
WALTER G CADY
by David Rines
ATTORNEY

Reissued Mar. 26, 1929. Re. 17,247

UNITED STATES PATENT OFFICE.

WALTER G. CADY, OF MIDDLETOWN, CONNECTICUT, ASSIGNOR TO RADIO CORPORATION OF AMERICA, A CORPORATION OF DELAWARE.

METHOD OF MAINTAINING ELECTRIC CURRENTS OF CONSTANT FREQUENCY.

Original No. 1,472,583, dated October 30, 1923, Serial No. 473,434, filed May 28, 1921. Application for reissue filed August 6, 1925. Serial No. 48,683.

DIVISION C

The invention which forms the subject of my present application for Letters Patent is an improvement in the art of producing and maintaining alternating currents of constant frequency. It is well known that, heretofore, the development of such currents, to any very high degree of precision, has been unattainable by ordinary means, and great difficulty has been experienced in producing alternating currents of high and constant frequency and free from fluctuations, due to disturbances in or near the generating system.

The useful applications of my invention are numerous. It may be employed in the transmission or the reception of intelligence by means of higher-frequency currents, or it may be used for the testing and measurement of such currents, in all cases where the frequency can be varied, and, in general, the invention is applicable to currents of any frequency.

In an application filed by me on January 28, 1920, Serial No. 354,659, which has matured into Patent No. 1,450.246, April 3, 1923, I have shown and described what I have termed a piezo-electric resonator, which, in general, comprises a plate of piezo-electric crystal with coatings on its opposite faces. The "coatings" may be either thin layers of metal on the crystal itself, or metallic plates in fixed relation to the crystal, or, in general, any means whereby an electric charge may be conducted to the resonator in such a way as to produce an electric field in the proper direction through the crystal. Such a device has a natural period of vibration, but when set in vibration by a source of alternating current connected to its coatings, the amplitude of such vibrations is very slight, unless the frequency of the alternating current approximates or equals the natural frequency of the device, in which case the reaction of the crystal upon the circuit may be very great. In carrying out my present invention, I utilize this piezo-electric resonator in the manner hereinafter to be described.

The special properties of the piezo-electric resonator that I take advantage of for my present purpose are—first; that property by virtue of which such a resonator, whose vibrations are maintained by impulses received from one electric circuit, may be used to transmit energy, in the form of an alternating current, into another circuit; second, that property which it possesses of modifying, by its reactions, the alternating current of a particular frequency or frequencies flowing to it; and third, the fact that the effective capacity of the resonator depends, in a manner which will more fully hereinafter appear, upon the frequency of the current in the circuit with which it may be connected.

In the description and explanations of my invention which follow, I have assumed the piezo-electric resonator to comprise a single, suitably prepared plate cut from a piezo-electric crystal, and provided with conductive coatings, and utilizing the so-called transverse effect; but all statements made apply equally to crystal preparations utilizing the longitudinal effect, and, in general, to any mechanical vibrating system whatever, having suitable preparations of piezo-electric crystals for setting the system into vibration and for utilizing its reactions.

Figure 2:
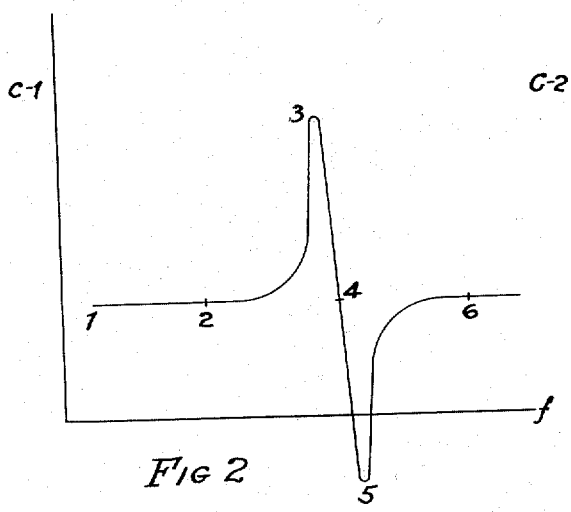
Figure 3:
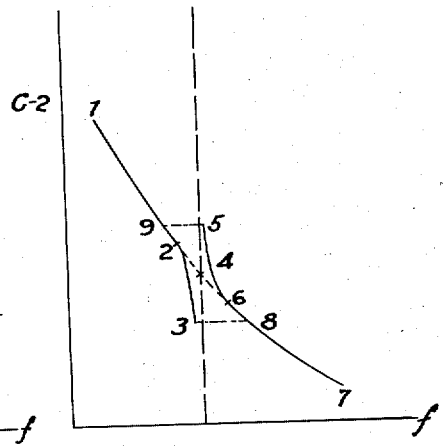

The nature and purpose of the present invention may be most readily comprehended by reference to the accompanying drawings, in which Fig. 1 is a diagram of the well known and universally recognized Armstrong oscillating circuit, selected for illustrative purposes and showing my invention applied thereto; and Figs. 2 and 3 are diagrams used in explaining the principles of the invention.

In accordance with the principle of operation set forth in my application, Serial No. 21,734, filed April 8, 1925, for reissue of my Letters Patent No. 1,472,583, of which the present application is a division, the piezo-electric resonator may be used with any generator of alternating current, such as a vacuum tube, the frequency of which is capable of being determined by the varying potential difference between two fixed points in the circuit or system of circuits. In Fig. 1, the numeral 1 represents the filament of the vacuum tube, 2 is the filament battery, 3 a regulating resistance, 4 the grid and 5 the anode of the vacuum tube. The battery in the anode circuit is designated by 6. These are the main, essential parts of one of the numerous types of circuit commonly used for the generation of high-frequency oscillations, the other elements being the coils 7 and 8 in the grid and anode circuits, respectively, 9 a variable condenser in parallel with the coil 7, for the purpose of controlling the frequency of the oscillations, 10 the grid condenser, and 11 the leak. All these are old and well known, the vacuum tube oscillating through the mutual inductance of the coils 7 and 8.

It is possible to secure constant frequency through the agency of a piezo-electric resonator which has only a single pair of plates or coatings, and this may be accomplished, in various ways, by taking advantage of one or other of the electrical effects produced by the resonator when approximating one of its resonating frequencies.

The following example illustrates the applicability of the piezo-electric resonator to the stabilization of the frequency when connected across the tuning condenser of a vacuum-tube, oscillating circuit. Now to understand this action, the theory of the piezo-electric resonator must be considered and borne in mind.

In my former patent, above referred to, I have shown that the apparent capacity of the piezo-electric resonator undergoes certain changes in the neighborhood of resonance, and these changes are of fundamental importance in the example now to be considered.

Let it be assumed, in illustration, that the resonator is connected to a high-frequency, sinusoidal electro-motive force of constant voltage. When the frequency is considerably below that at which the resonator vibrates, the latter behaves like a simple condenser, having a certain capacity, which may be termed its "normal" capacity. As the frequency is raised to a value at which the piezo-electric resonator begins to vibrate perceptibly, the elongation of the resonator plate is at first nearly in phase with the mechanical stress, which, in turn, is always exactly in phase with the voltage across the resonator. Hence, in accordance with the well-known laws of piezo-electricity, the piezo-electric polarization resulting from the elongation is nearly in phase with the impressed voltage, thus causing the total dielectric displacement in the piezo-electric resonator to be greater than normal.

Since the apparent, or, as it may be termed, the equivalent, capacity of the resonator is, other things being equal, proportional to the total dielectric displacement, it follows that so long as the frequency is below the resonant value, the apparent capacity is abnormally large. It may, in fact, be many times in excess of the normal value. But after passing through a maximum, the apparent capacity decreases, and close to the resonant frequency, it returns to its normal value. Upon a further increase in frequency, the apparent capacity becomes abnormally small, in some cases even attaining a considerable negative value. If the frequency continues to increase, a minimum in the apparent capacity is reached, after which it gradually returns to its normal value. These effects are due to the change in phase of elongation with respect to the driving force which the vibrating resonator, in common with all systems undergoing forced vibrations, experiences in the neighborhood of resonance.

I have represented these changes in the diagram of Fig. 2, in which the apparent capacity of the piezo-electric resonator, which may be denoted by $C^1$, is plotted as a function of the frequency $f$. Starting at a low value of frequency, the apparent capacity has its normal value, represented by the point indicated by 1. As the frequency $f$ increases, the apparent capacity $C^1$ remains approximately constant until, at a frequency corresponding to the point 2, the resonator begins to vibrate perceptibly, and the curve begins to rise. The points 3, 4, 5, 6 and 7 are reached, in succession, in accordance with the theory stated.

Assume, now, therefore, that the coatings 13 and 14 of the piezo-electric resonator 12 are connected in parallel with the tuning condenser 9, as shown in Fig. 1.

Let the capacity of the condenser 9 be denoted by $C^2$. If the capacity $C^1$ were constant, then a decrease in capacity $C^2$ would result in a continuous increase in the frequency $f$, as indicated in Fig. 3, by the curve 1, 9, 2, 4, 6, 8 and 7. Suppose, however, and observing that the corresponding points in Figs. 2 and 3 are similarly numbered, that the piezo-electric resonator begins to vibrate perceptibly at a frequency corresponding to the point 2, thereupon the capacity $C^1$ begins to be abnormally large and therefore tends to diminish the frequency, with the result that the frequency increases less than it otherwise would. Continued decrease of the capacity $C^2$ causes capacity $C^1$ to increase still further, so that the curve bends down along the portion 2, 3. At point 3, the apparent capacity $C^1$ has reached its greatest possible value, and if $C^2$ be further decreased the resonator plate suddenly ceases to vibrate, or, at best, it vibrates feebly, at a much higher frequency, namely, the frequency corresponding to the point 8. In other words, the curve springs abruptly from the point 3 to the point 8. From this point on, any further decrease in $C^2$ gives rise merely to the undisturbed portion 8, 7 of the curve. If, on the other hand, the capacity $C^2$ be increased, beginning at the point 7, the path 7, 8, 6, 5, 9, 1 will be traced, for reasons strictly analogous to those given for the curve described on decreasing the capacity $C^2$, as stated above.

The less damped the vibrations of the piezo-electric resonator, the more nearly constant will be the frequency over the portions of the curve 2, 3 and 5, 6 in Fig. 3. Hence, it is manifest that a resonator made from materials of good mechanical properties, such as quartz, or a combination of quartz and steel, suitably prepared and mounted, as has been set forth in my prior patent, will exert a marked stabilizing effect upon the frequency of the generating circuit with which it is connected. Any disturbing agent, as, for example, small changes in the value of $C^2$, or in other capacities in the circuit, or variations in the filament current, will have almost no effect at all upon the frequency, so long as such disturbing agent is not so pronounced as to cause the operating point on the curve to fall outside of the ranges 2, 3 and 5, 6.

Having now described my invention what I claim is:

1. An oscillating system comprising an output circuit, an input circuit having a coil, a condenser disposed in parallel with the coil, a condenser disposed in series with the coil, and a piezo-electric body connected around the parallel-disposed condenser, the body being designed to maintain the frequency of the oscillations substantially constant.

2. An alternating-current system comprising an alternating-current circuit having a condenser, and a piezo-electric resonator in parallel with the condenser.

3. An alternating-current system comprising a space-current device having an input circuit and an output circuit, one of the circuits having a tuning capacity, and a piezo-electric resonator in parallel with the capacity.

4. An oscillating system comprising a variable condenser and means in parallel with the condenser for controlling the oscillations of the system, the said means having a capacity that is adapted to diminish automatically when the capacity of the condenser increases.

5. An oscillating system comprising a variable condenser and means in parallel with the condenser for controlling the oscillations of the system, the said means having a capacity that is adapted to increase automatically when the capacity of the condenser is diminished.

6. An oscillating system comprising a variable condenser and a piezo-electric body in parallel with the condenser, the body being so designed that its capacity varies oppositely to the capacity of the condenser, whereby the frequency of the oscillations is maintained substantially constant.

7. An oscillating system comprising an input circuit and an output circuit each having a separate coil, the coils being coupled together, and an electro-mechanical vibrator connected with the circuits, the vibrator being adapted to vibrate mechanically when stimulated electrically and to respond electrically when vibrated mechanically and being designed to maintain the frequency of the oscillations substantially constant.

8. An oscillating system comprising an input circuit and an output circuit each having a separate coil, the coils being coupled together, and a piezo-electric body connected with the circuits, the body being designed to maintain the frequency of the oscillations substantially constant.

9. An alternating-current system comprising an input circuit and an output circuit loosely coupled together, and an electro-mechanical vibrator adapted to vibrate mechanically when stimulated electrically and respond electrically when vibrated mechanically, the system being adapted to oscillate without the aid of the electro-mechanical vibrator, and the system being adapted to oscillate with the aid of the electro-mechanical vibrator when the coupling is loosened so that the system will not oscillate without the aid of the electro-mechanical vibrator.

10. An oscillating system comprising an input circuit and an output circuit each having a separate coil, the coils being coupled together, and a piezo-electric body having a plurality of coatings connected with the coils, the body being designed to maintain the frequency of the oscillations substantially constant.

11. An oscillating system comprising an output circuit, an input circuit having a condenser, and an electro-mechanical vibrator connected around the condenser, the vibrator being adapted to vibrate mechanically when stimulated electrically and to respond electrically when vibrated mechanically and being designed to maintain the frequency of the oscillations substantially constant.

12. An oscillating system comprising an input circuit and an output circuit each having a coil, the coils being coupled together, the input circuit having a condenser, and a piezo-electric body having a plurality of coatings connected with the terminals of the coil in the output circuit and around the condenser, the body being designed to maintain the frequency of the oscillations substantially constant.

13. An oscillating system comprising an output circuit, an input circuit having a coil, a condenser disposed in parallel with the coil, a condenser disposed in series with the coil, and an electro-mechanical vibrator connected around one of the condensers, the vibrator being adapted to vibrate mechanically when stimulated electrically and to respond electrically when vibrated mechanically and being designed to maintain the frequency of the oscillations substantially constant.

14. An oscillating system comprising an output circuit, an input circuit having a coil, a condenser disposed in parallel with the coil, a condenser disposed in series with the coil, and a piezo-electric body connected around one of the condensers, the body being designed to maintain the frequency of the oscillations substantially constant.

15. An oscillating system comprising a space-current device, an electro-mechanical vibrator adapted to vibrate mechanically when stimulated electrically and to respond electrically when vibrated mechanically, the vibrator having two coatings only, and means connecting the coatings with the space-current device to cause the system to oscillate at substantially constant frequency.

16. An oscillating system comprising a space-current device, a piezo-electric body having two coatings only and means connecting the coatings with the space-current device to cause the system to oscillate at substantially constant frequency.

17. An oscillating system comprising a variable condenser, and a piezo-electric body so designed and connected with the system that it shall be maintained in vibration by the electric oscillations in the system, the body having a variable capacity that serves to help maintain it in vibration, whereby the frequency of the oscillations is maintained substantially constant.

In testimony whereof, I hereunto affix my signature.

WALTER G. CADY.